United States Patent
Kim et al.

(10) Patent No.: US 11,325,445 B2
(45) Date of Patent: May 10, 2022

(54) THERMAL MANAGEMENT SYSTEM FOR VEHICLE

(71) Applicants: Hyundai Motor Company, Seoul (KR); Kia Motors Corporation, Seoul (KR)

(72) Inventors: Jae Yeon Kim, Hwaseong-si (KR); Su Whan Kim, Hwaseong-si (KR)

(73) Assignees: Hyundai Motor Company, Seoul (KR); Kia Motors Gorporation, Seoul (KR)

(*) Notice: Subject to any disclaimer, the term of this patent is extended or adjusted under 35 U.S.C. 154(b) by 0 days.

(21) Appl. No.: 16/663,721

(22) Filed: Oct. 25, 2019

(65) Prior Publication Data

US 2021/0001686 A1 Jan. 7, 2021

(30) Foreign Application Priority Data

Jul. 2, 2019 (KR) .................. 10-2019-0079278

(51) Int. Cl.
*B60H 1/14* (2006.01)
*B60H 1/32* (2006.01)
(Continued)

(52) U.S. Cl.
CPC ......... *B60H 1/143* (2013.01); *B60H 1/00007* (2013.01); *B60H 1/00278* (2013.01);
(Continued)

(58) Field of Classification Search
CPC .. B60H 1/143; B60H 1/00921; B60H 1/3228; B60H 1/32284; B60H 1/00007;
(Continued)

(56) References Cited

U.S. PATENT DOCUMENTS 2,183,452 A * 12/1939 Gibbs ................ B60H 1/00007
62/7
4,400,446 A * 8/1983 Hacha ................. H01M 10/365
429/57
(Continued)

FOREIGN PATENT DOCUMENTS

CN 103380339 B 1/2016
EP 2 392 486 A2 12/2011
(Continued)

OTHER PUBLICATIONS

Extended European Search Report dated Apr. 28, 2020 for European Patent Application No. 19204263.8.

*Primary Examiner* — Ljiljana V. Ciric
(74) *Attorney, Agent, or Firm* — Morgan, Lewis & Bockius LLP (57) ABSTRACT

A vehicle thermal management system includes a cooling apparatus including a radiator, a first water pump, and a valve connected through a coolant line, a battery cooling apparatus including a second water pump and a battery module connected by a battery coolant line; a chiller connected to the battery coolant line and connected to an air conditioner through a refrigerant connection line connected to the battery coolant line and connected to a refrigerant line of the air conditioner through a refrigerant connection line, to adjust a temperature of the coolant by performing heat exchange between a coolant supplied to the battery coolant line and a refrigerant selectively supplied from the air conditioner; and a heating circuit for warming an interior of the vehicle by use of the coolant having a temperature increased while the coolant passes through at least one electrical component.

18 Claims, 7 Drawing Sheets

(51) Int. Cl.
*B60H 1/00* (2006.01)
*B60H 1/26* (2006.01)
*B60H 1/22* (2006.01)

(52) U.S. Cl.
CPC ..... *B60H 1/00342* (2013.01); *B60H 1/00392* (2013.01); *B60H 1/00428* (2013.01); *B60H 1/00921* (2013.01); *B60H 1/26* (2013.01); *B60H 1/3227* (2013.01); *B60H 1/3228* (2019.05); *B60H 1/32284* (2019.05); *B60H 2001/224* (2013.01)

(58) Field of Classification Search
CPC ............ B60H 1/00278; B60H 1/00342; B60H 1/00392; B60H 1/00428; B60H 1/026; B60H 1/3227; B60H 2001/224; B60H 2001/00928; B60H 1/00899; B60H 1/00271; B60H 1/00571; B60H 1/00885; B60H 1/00385; B60H 1/3213; B60K 1/00; B60K 2001/005; B60L 58/26; F25B 27/02; Y02T 10/70
See application file for complete search history.

(56) References Cited

U.S. PATENT DOCUMENTS

| | | | | |
|---|---|---|---|---|
| 5,662,188 | A * | 9/1997 | Ito | B62D 5/07 |
| | | | | 184/11.1 |
| 5,794,575 | A * | 8/1998 | Sonnemann | F01P 7/165 |
| | | | | 123/41.08 |
| 6,145,339 | A * | 11/2000 | Pomme | F25B 41/30 |
| | | | | 62/509 |
| 8,215,432 | B2 | 7/2012 | Nemesh et al. | |
| 8,899,062 | B2 | 12/2014 | Kadle et al. | |
| 9,109,840 | B2 | 8/2015 | Kadle et al. | |
| 9,239,193 | B2 | 1/2016 | Kadle et al. | |
| 10,018,308 | B2 * | 7/2018 | Fuller | G01F 23/0007 |
| 10,166,835 | B2 * | 1/2019 | Kim | B60H 1/00278 |
| 10,252,599 | B2 * | 4/2019 | Kim | B60H 1/00385 |
| 10,343,483 | B2 * | 7/2019 | Kim | B60H 1/00278 |
| 10,486,493 | B2 * | 11/2019 | Kim | B60H 1/143 |
| 10,625,563 | B2 * | 4/2020 | Kim | B60H 1/00885 |
| 10,677,500 | B2 * | 6/2020 | Kim | F25B 40/00 |
| 10,814,692 | B2 * | 10/2020 | Kim | B60H 1/3223 |
| 10,889,157 | B2 * | 1/2021 | Kim | B60H 1/00921 |
| 10,974,566 | B2 * | 4/2021 | Kim | B60H 1/00921 |
| 10,987,998 | B2 * | 4/2021 | Kim | B60H 1/00885 |
| 2008/0035647 | A1 * | 2/2008 | Fuller | G01F 23/0007 |
| | | | | 220/530 |
| 2012/0070703 | A1 * | 3/2012 | Wahl | H01M 50/35 |
| | | | | 429/53 |
| 2013/0011702 | A1 * | 1/2013 | Horne | B60L 50/64 |
| | | | | 429/51 |
| 2013/0283838 | A1 | 10/2013 | Kadle et al. | |
| 2015/0266384 | A1 * | 9/2015 | Kitanaka | B60L 50/40 |
| | | | | 318/400.3 |
| 2015/0330577 | A1 * | 11/2015 | Fuller | F24D 3/1008 |
| | | | | 73/290 R |
| 2017/0158081 | A1 * | 6/2017 | Kim | H01M 10/613 |
| 2017/0197490 | A1 * | 7/2017 | Enomoto | B60H 1/00485 |
| 2018/0111443 | A1 * | 4/2018 | Kim | B60H 1/00278 |
| 2018/0117984 | A1 * | 5/2018 | Kim | B60H 1/00885 |
| 2018/0117985 | A1 | 5/2018 | Kim et al. | |
| 2018/0117990 | A1 * | 5/2018 | Kim | B60H 1/00278 |
| 2018/0117991 | A1 * | 5/2018 | Kim | B60H 1/00392 |
| 2019/0047352 | A1 * | 2/2019 | Kim | B60H 1/32284 |
| 2019/0047369 | A1 * | 2/2019 | Kim | B60H 1/00385 |
| 2019/0176572 | A1 | 6/2019 | Kim | |
| 2020/0180390 | A1 * | 6/2020 | Kim | B60H 1/00921 |
| 2020/0338950 | A1 * | 10/2020 | Kim | B60H 1/00278 |
| 2020/0369108 | A1 * | 11/2020 | Kim | B60H 1/00571 |
| 2020/0398642 | A1 * | 12/2020 | Kim | B60H 1/00278 |
| 2021/0001686 | A1 * | 1/2021 | Kim | B60H 1/00392 |

FOREIGN PATENT DOCUMENTS

| | | | |
|---|---|---|---|
| GB | 492724 A * | 9/1938 | |
| JP | 5336033 B2 | 11/2013 | |
| WO | WO-2008021114 A2 * | 2/2008 | ............ F24D 3/1016 |

* cited by examiner

THERMAL MANAGEMENT SYSTEM FOR VEHICLE

CROSS-REFERENCE TO RELATED APPLICATION

The present application claims priority to Korean Patent Application No. 10-2019-0079278 filed on Jul. 2, 2019, the entire contents of which is incorporated herein for all purposes by this reference.

BACKGROUND OF THE INVENTION

Field of the Invention

The present invention relates to a vehicle thermal management system, and more particularly, to a vehicle thermal management system which adjusts a temperature of a battery module by use of one chiller that performs heat exchange between a refrigerant and a coolant and improves heating efficiency by use of waste heat generated from an electrical component.

Description of Related Art

In recent years, an electric vehicle has become popular as a future transporting means, as environment and energy resources are becoming important issues. The electric vehicle utilizes a battery module in which a plurality of rechargeable cells is formed as one pack as a main power source, and thus no exhaust gas is generated and noise is very low.

Such an electric vehicle is driven by a drive motor which operates through electric power supplied from the battery module. Furthermore, the electric vehicle includes electrical components for controlling and managing the drive motor as well as a plurality of electronic convenience devices and charging the battery module.

On the other hand, since a large amount of heat is generated in the battery and the electrical components as well as the drive motor used as a primary power source of the electric vehicle, efficient cooling is required, so efficient temperature management of the electrical components and the battery module may be a very important problem.

Conventionally, separate cooling systems are applied to adjust the temperature of the electrical components and the battery module, but it is necessary to increase capacity of the cooling system according thereto, which leads to space restrictions. Furthermore, when the capacity of the cooling systems is increased, power required for operating the cooling systems is also increased.

Accordingly, it is required to develop technologies for efficiently using the waste heat generated from the electrical components, as well as adjusting the temperature of the electrical components and the battery to maximize the energy efficiency while securing the durability of the electrical components and the battery module in the electric vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle thermal management system, which adjusts a temperature of a battery module by use of one chiller that performs heat exchange between a refrigerant and a coolant and improves heating efficiency by use of waste heat generated from an electrical component.

Various aspects of the present invention are directed to providing a vehicle thermal management system, including: a cooling apparatus configured to include a radiator, a first water pump, and a valve which are connected through a coolant line, and to circulate a coolant in the coolant line to cool at least one electrical component provided in the coolant line; a battery cooling apparatus configured to include a second water pump and a battery module which are connected by a battery coolant line, to circulate the coolant in the battery module; a chiller which is connected to the battery coolant line and connected to an air conditioner through a refrigerant connection line which is connected to the battery coolant line and connected to a refrigerant line of an air conditioner through a refrigerant connection line, to adjust a temperature of the coolant by performing heat exchange between a coolant which is supplied to the battery line and a refrigerant which is selectively supplied from the air conditioner; and a heating circuit of warming an interior of the vehicle by use of the coolant having a temperature which is increased while passing through the electrical component.

A reservoir tank having a diaphragm formed in the reservoir tank may be provided in the coolant line between the radiator and the first water pump, and the reservoir tank may include a first storage unit partitioned by the diaphragm to which the coolant line is connected, and a second storage unit to which the battery coolant line is connected.

The heating circuit may include: a first connection line having a first end portion connected to the coolant line through the valve, and a second end portion connected to a heater; and a second connection line having a first end portion connected to the coolant line between the radiator and the reservoir tank, and a second end portion connected to the heater, wherein the heater may be provided inside a heating, ventilation, and air conditioning (HVAC) module disposed in the air conditioner.

The heating circuit further includes a coolant heater provided in the first connection line, and the coolant heater may selectively heat the coolant supplied to the heater through the first connection line.

The air conditioner may include: a heating, ventilation, and air conditioning (HVAC) module configured to include an evaporator which is connected thereto through the refrigerant line and an opening and closing door configured to control outside air passing through the evaporator to be selectively introduced into the heater depending on cooling, heating, and heating/dehumidifying modes of the vehicle therein; a condenser connected to the coolant line and the refrigerant line, to circulate a coolant therein to perform heat exchange between the coolant and a refrigerant supplied through the refrigerant line; a compressor connected between the evaporator and the condenser through the refrigerant line; a sub-condenser provided in the refrigerant line between the condenser and the evaporator; a first expansion valve provided in the refrigerant line between the sub-condenser and the evaporator; and a second expansion valve provided in the refrigerant connection line.

A first end portion of the refrigerant connection line may be connected to the refrigerant line between the sub-condenser and the first expansion valve, and a second end portion of the refrigerant connection line may be connected to the refrigerant line between the evaporator and the compressor.

Each of the chiller and the condenser may be a water-cooled heat exchanger, and the sub-condenser may be an air-cooled heat exchanger.

The HVAC module may further include an air heater provided at an opposite side of the evaporator, with the heater disposed between the air heater and the evaporator to selectively heat outside air passing through the heater.

The air heater may be operated to raise a temperature of the outside air passing through the heater when a temperature of a coolant supplied to the heater is lower than a target temperature for internal heating.

When the battery module is cooled in the cooling mode of the vehicle, a coolant may circulate through the coolant line by an operation of the first water pump in the cooling apparatus; the first connection line may be closed through an operation of the valve, and the second connection line may be closed; in the battery cooling apparatus, a coolant may be circulated along the battery coolant line through an operation of the second water pump; the refrigerant line connecting the sub-condenser and the evaporator may be open through operation of the first expansion valve in the air conditioner; the refrigerant connection line may be open through operation of the second expansion valve; and the first and second expansion valves may expand a refrigerant supplied to the refrigerant line and the refrigerant connection line, respectively, and may supply the expanded refrigerant to the evaporator and the chiller.

When a heating/dehumidification mode of the vehicle, the first connection line may be open through operation of the valve, and the second connection line may be open; in the cooling apparatus, some of the coolant having the temperature that has risen through the electrical component by the operation of the first water pump may be supplied to the heater along the first connection line, and a remaining coolant may be flowed into the radiator; a coolant passing through the radiator and a coolant discharged from the heater and introduced into the second connection line may flow together into the reservoir tank along the coolant line; in the air conditioner, the refrigerant line connecting the sub-condenser and the evaporator may be open through operation of the first expansion valve; the refrigerant connection line may be closed through operation of the second expansion valve; and the first expansion valve may expand the refrigerant and may supply the refrigerant to the evaporator.

When cooling the electrical component using the coolant, the first connection line may be closed through operation of the valve, and the second connection line may be closed; and the coolant cooled in the radiator and stored in the first storage unit of the reservoir tank may be circulated along the coolant line through an operation of the first water pump, and may be supplied to the electrical component.

When waste heat of the electrical component is recovered in a heating mode of the vehicle, the first connection line may be open through an operation of the valve, and the second connection line may be open; in the cooling apparatus, a portion of the coolant line connected to the radiator may be closed based on the first and second connection lines; some of the coolant having a temperature that has risen through the electrical component by an operation of the first water pump may be supplied to the heater along the first connection line without passing through the radiator; and the coolant discharged from the heater may be introduced into the reservoir tank along the coolant line connected to the second connection line.

The valve may open the coolant line connected to the radiator to allow some of the coolant passing through the electrical component to flow into the first connection line and the remaining coolant to flow into the radiator when the electrical component is overheated, and the coolant passing through the radiator may be introduced into the reservoir tank along the coolant line along with the coolant flowing through the second connection line.

The valve may be a three-way valve configured for distributing a flow.

The electrical component may include an electric power control unit (EPCU), a motor, an inverter, or an on board charger (OBC).

The heating circuit may include: a branch line having a first end portion connected to the coolant line through the valve, and a second end portion connected to the coolant line between the radiator and the electrical component; and a heater connected to the coolant line connecting the electrical component and the valve, wherein the heater may be provided inside a heating, ventilation, and air conditioning (HVAC) module disposed in the air conditioner.

A coolant heater may be provided in the coolant line between the electrical component and the heater, and the coolant heater may selectively heat the coolant supplied to the heater.

A described above, according to the vehicle thermal management system according to the exemplary embodiment of the present invention, the temperature of the battery module may be adjusted by use of one chiller for performing heat exchange between the coolant and the refrigerant, and the interior of the vehicle may be heated by use of the coolant, simplifying the entire system.

According to an exemplary embodiment of the present invention, it is also possible to improve the heating efficiency by recovering waste heat from the electrical component and using it for internal heating.

Furthermore, according to an exemplary embodiment of the present invention, it is possible to optimize the performance of the battery module by efficiently controlling the temperature of the battery module, and increase an overall travel distance of the vehicle through efficient management of the battery module.

Furthermore, the entire system may be simplified to reduce manufacturing cost and weight, and to improve space utilization.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will hereinafter be described in detail with reference to the accompanying drawings.

Since the exemplary embodiment described in the specification and the configurations shown in the drawings are merely the most preferable exemplary embodiment and configurations of the present invention, they do not represent all of the technical ideas of the present invention, and it may be understood that various equivalents and modified examples, which may replace the exemplary embodiments of the present invention, are possible when filing the present application.

To clearly describe the present invention, portions that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and to clearly illustrate several portions and areas, enlarged thicknesses are shown.

Furthermore, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 1:
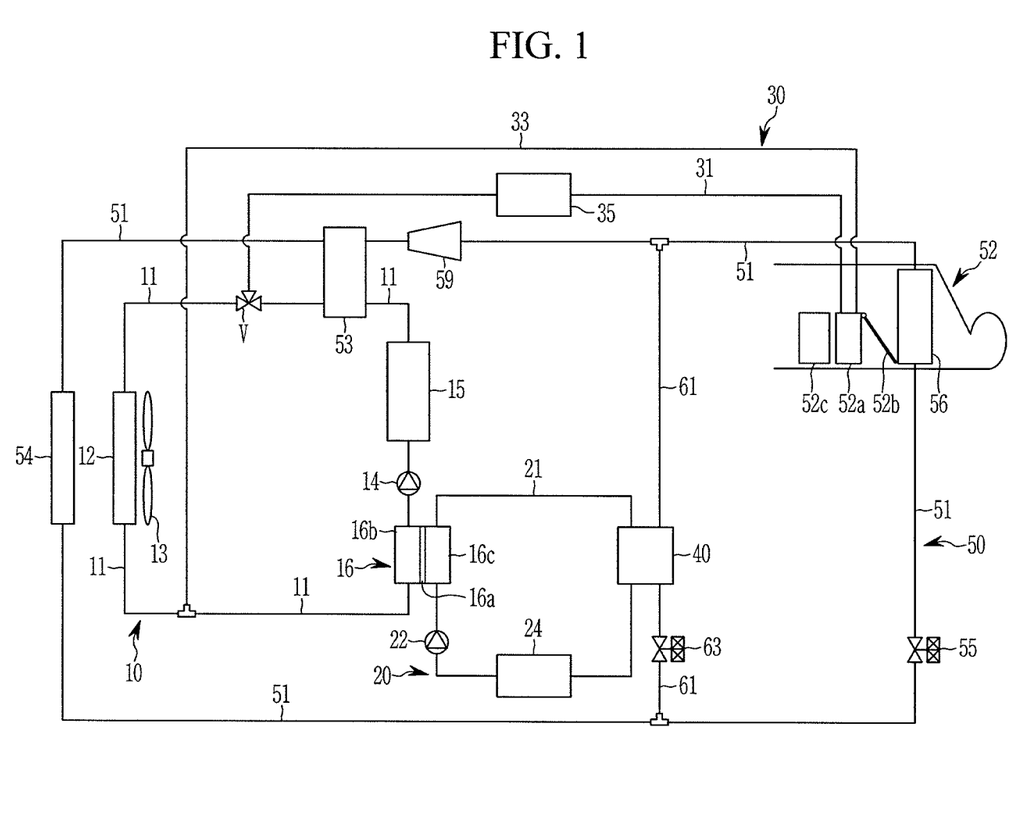
FIG. 1 illustrates a block diagram of a vehicle thermal management system according to an exemplary embodiment of the present invention.

FIG. 1 illustrates a block diagram of a vehicle thermal management system according to an exemplary embodiment of the present invention.

According to the exemplary embodiment of the present invention, the vehicle thermal management system may adjust a temperature of a battery module 24 by use of one chiller 40 for performing heat exchange between a refrigerant and a coolant, and may recover waste heat generated from an electrical component 15 to use it for internal heating.

Such a thermal management system may be applied to electric vehicles.

Referring to FIG. 1, the thermal management system may include a cooling apparatus 10, a battery cooling apparatus 20, a heating circuit 30, and the chiller 40.

First, the cooling apparatus 10 includes a radiator 12 connected to a coolant line 11, a first water pump 14, and a valve V.

The radiator 12 is mounted in the front of the vehicle, and a cooling fan 13 is mounted behind the radiator 12, so that the coolant is cooled through an operation of the cooling fan 13 and heat exchange with the outside air.

Furthermore, the electrical component 15 may include an electric power control unit (EPCU), a motor, an inverter, or an on board charger (OBC).

The electrical component 15 configured as described above may be provided in the coolant line 11 to be cooled in a water-cooled manner.

Accordingly, when the waste heat of the electrical component 15 is recovered in the heating mode of the vehicle, the heat generated from the EPCU, the motor, the inverter, or the OBC may be recovered.

This cooling apparatus 10 may circulate the coolant in the coolant line 11 such that the coolant is supplied to the electrical component 15 provided in the coolant line 11.

On the other hand, when the motor is cooled by the oil cooling method, the motor may be provided separately from the electrical component 15, and may be connected to the water-cooled oil cooler provided in the coolant line 11 to be cooled.

Herein, a reservoir tank 16 having a diaphragm 16*a* formed therein may be provided in the coolant line 11 between the radiator 12 and the first water pump 14.

The interior of the reservoir tank 16 may be partitioned into first and second storage units 16*b* and 16*c* through the diaphragm 16*a*. The first storage units 16*b* is connected to the coolant line 11. The coolant cooled by the radiator 12 may be stored in the first storage units 16*b*.

In the exemplary embodiment of the present invention, the battery cooling apparatus 20 includes a second water pump 22 connected to a battery coolant line 21, and the battery module 24.

Herein, the battery coolant line 21 is connected to the second storage unit 16*c* of the reservoir tank 16.

That is, the battery cooling apparatus 20 is connected to the reservoir tank 16 through the battery coolant line 21.

Therefore, the coolant stored in the second storage unit 16*c* may be circulated in the battery cooling apparatus 20 independently of cooling apparatus 10 in which the coolant stored in the first storage unit 16*b* circulates.

The battery cooling apparatus 20 configured as described above may circulate the coolant stored in the second storage unit 16c selectively in the battery module 24 through an operation of the second water pump 22.

Herein, the first water pump 14 and the second water pump 22 may each be an electric water pump.

In the exemplary embodiment of the present invention, the chiller 40 is connected to the battery coolant line 21, and is connected to a refrigerant line 51 of an air conditioner 50 through a refrigerant connection line 61. That is, the chiller 40 may be a water-cooled heat exchanger into which a coolant flows.

Accordingly, the chiller 40 may regulate the temperature of the coolant circulates the battery coolant line 21 by performing heat exchange between the coolant which is supplied through the battery coolant line 21 and the refrigerant which is selectively supplied from the air conditioner 50.

The heating circuit 30 may heat the interior of the vehicle using the coolant having the temperature which is increased while it passes through the electrical component 15 thereto.

The heating circuit 30 may include first and second connection line 31 and 33.

A first end portion of the first connection line 31 may be connected to the coolant line 11 through the valve V, and a second end portion of the first connection line 31 may be connected to the heater 52a.

A first end portion of the second connection line 33 may connected to the coolant line 11 between the radiator 12 and the reservoir tank 16, and a second end portion of the second connection line 33 may be connected to the heater 52a.

Furthermore, the heater 52a may be provided inside a heating, ventilation, and air conditioning (HVAC) module 52 included in the air conditioner 50.

Accordingly, when heating the interior of the vehicle, the heating circuit 30 may supply the high temperature coolant to the heater 52a through the first connection line 31 which is open by operation of the valve V and the open the second connection line 33.

Herein, the heating circuit 30 may further include a coolant heater 35 provided in the first connection line 31 between the valve V and the heater 52a.

The coolant heater 35 may increase a temperature of the coolant by selectively heating the coolant circulating along the first connection line 31.

That is, the coolant heater 35 is ON-operated when the temperature of the coolant supplied to the heater 52a in the heating mode of the vehicle is lower than a target temperature to heat the coolant circulated in the first connection line 31, inflowing the coolant of which the temperature is increased to the heater 52a.

The coolant heater 35 may be an electric heater that operates according to the power supply.

On the other hand, in the exemplary embodiment of the present invention, it is described that the coolant heater 35 is provided in the first connection line 31, however it is not limited thereto, and an air heater 52c to increase the temperature of the outside air inflowing to the interior of the vehicle may be applied instead of the coolant heater 35.

The air heater 52c may be operated to raise the temperature of the outside air passing through the heater 52a when the temperature of the coolant supplied to the heater 52a is lower than a target temperature for internal heating.

The air heater 52c may be mounted on the rear of the heater 52a toward the interior of the vehicle inside the HVAC module 52 to selectively heat the outside air passing through the heater 52a.

That is, the heating apparatus 30 may be applied to one of the coolant heater 35 and the air heater 52c.

In the exemplary embodiment of the present invention, the air conditioner 50 includes the HVAC module 52, a condenser 53, a sub-condenser 54, a first expansion valve 55, an evaporator 56, and a compressor 59 which are connected through the refrigerant line 51.

First, the HVAC module 52 includes the evaporator 56 connected therewith through the refrigerant line 51, and an opening and closing door 52b for controlling the outside air passing through the evaporator 56 to be selectively introduced into the heater 52a depending on cooling, heating, and heating/dehumidifying modes of the vehicle therein.

That is, the opening and closing door 52b is open to allow the outside air passing through the evaporator 56 to be introduced into the heater 52a in the heating mode of the vehicle. In contrast, in the cooling mode of the vehicle, the opening and closing door 52b closes off the heater 52a such that the outside air which is cooled while passing through the evaporator 56 directly flows into the vehicle.

The HVAC module 52 may further include an air heater 52c provided at an opposite side of the evaporator 56 with the heater 52a interposed therebetween to selectively heat the outside air passing through the heater 52a.

The air heater 52c may be operated to raise the temperature of the outside air passing through the heater 52a when the temperature of the coolant supplied to the heater 52a is lower than a target temperature for internal heating.

As described above, the air heater 52c may be applied when the coolant heater 35 is not provided in the first connection line 31.

That is, when the coolant heater 35 is applied to the heating circuit 30, the air heater 52c may not be provided, and when the coolant heater 35 is not applied, the air heater 52c may be provided.

In the exemplary embodiment of the present invention, the condenser 53 is connected to the refrigerant line 51 to allow the refrigerant to pass therethrough, and is connected to the coolant line 11 to allow the coolant circulating in the cooling apparatus 10 to pass therethrough.

This condenser 53 may condense the refrigerant through heat exchange with the coolant supplied through the coolant line 11. That is, the condenser 53 may be a water-cooled heat exchanger into which a coolant flows.

The condenser 53 configured as described above may perform heat exchange between the refrigerant supplied from the compressor 59 and the coolant supplied from the cooling apparatus 10 to condense the refrigerant.

In the exemplary embodiment of the present invention, the sub-condenser 54 may be provided in the refrigerant line 51 between the condenser 53 and the evaporator 56.

Herein, the sub-condenser 54 may further condense the refrigerant condensed in the condenser 53 through heat exchange with the outside air. In other words, the sub-condenser 54 is mounted in front of the radiator 12 to exchange heat between the refrigerant flowing into the sub-condenser 54 with the outside air.

As a result, the sub-condenser 54 may be an air-cooled heat exchanger for condensing the refrigerant by use of outside air.

Accordingly, the sub-condenser 54 may further condense the refrigerant which is condensed in the condenser 53 to increase sub cooling of the coolant, improving a coefficient of performance (COP), which is a coefficient of the cooling capacity relative to the power required by the compressor.

The first expansion valve 55 is provided in the refrigerant line 51 between the sub-condenser 54 and the evaporator 56.

The first expansion valve 55 receives the refrigerant passing through the second condenser 54 to expand it.

In the exemplary embodiment of the present invention, a first end portion of the refrigerant connection line 61 is connected to the refrigerant line 51 between the sub-condenser 54 and the first expansion valve 55. A second end portion of the refrigerant connection line 61 may be connected to the refrigerant line 51 between the evaporator 56 and the compressor 59.

Herein, a second expansion valve 63 is provided in the refrigerant connection line 61. The second expansion valve 63 may expand the refrigerant flowing through the refrigerant connection line 61 to introduce it into the chiller 40 when the battery module 24 is cooled by the refrigerant.

That is, the second expansion valve 63 is operated to expand the refrigerant when the battery module 24 is cooled by use of the refrigerant in the cooling mode of the vehicle.

This second expansion valve 63 may introduce the refrigerant exhausted from the sub-condenser 54 into the chiller 40 in a state where the temperature of the refrigerant is reduced by expanding the refrigerant, to further reduce the temperature of the coolant passing through the interior of the chiller 40.

As a result, the coolant having the temperature which is reduced while passing through the chiller 40 is introduced into the battery module 24, being more efficiently cooled.

The compressor 59 is connected thereto between the evaporator 56 and the condenser 53 through the refrigerant line 51. This compressor 59 may compress the gaseous refrigerant and supply the compressed refrigerant to the condenser 53.

Herein, the first and second expansion valves 55 and 63 may be electronic expansion valves that selectively expand the coolant while controlling a flow of the refrigerant through the coolant line 51 or the refrigerant connection line 61.

Alternatively, the valve V may be a three-way valve configured for distributing the flow.

Hereinafter, an operation and function of the vehicle thermal management system according to the exemplary embodiment of the present invention configured as described above will be described in detail with reference to FIG. 2 to FIG. 6.

First, an operation of a case of cooling the electrical component 15 using the radiator 12 in the vehicle thermal management system according to the exemplary embodiment of the present invention will be described with reference to FIG. 2.

Figure 2:
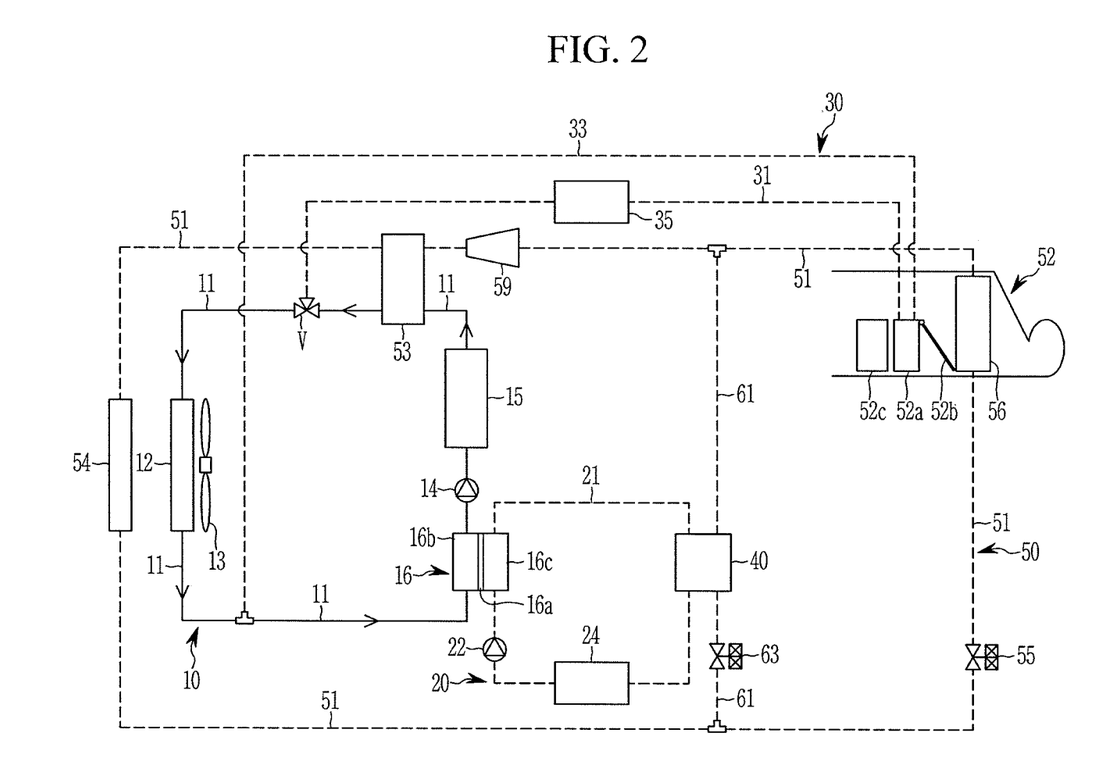
FIG. 2 illustrates an operational state diagram for cooling electrical components by use of a radiator in a vehicle thermal management system according to an exemplary embodiment of the present invention.

FIG. 2 illustrates an operational state diagram for cooling electrical components by use of a radiator in a vehicle thermal management system according to an exemplary embodiment of the present invention.

Referring to FIG. 2, the first connection line 31 is closed through an operation of the valve V. Furthermore, the second connection line 33 is closed.

In the present state, in the cooling apparatus 10, the first water pump 14 is operated to cool the electrical component 15.

Accordingly, the coolant which is cooled in the radiator 12 and stored in the first storage unit 16b of the reservoir tank 16 is supplied to the electrical component 15.

That is, the coolant cooled in the radiator 12 and stored in the first storage unit 16b of the reservoir tank 16 may be circulated along the coolant line 11 through an operation of the first water pump 14 to cool the electrical component 15.

Thus, the electrical component 15 may be efficiently cooled through the coolant cooled in the radiator 12.

Here, the battery cooling apparatus 20 is not operated, and the air conditioner 50 is not operated because the cooling mode of the vehicle is not activated.

Meanwhile, in an exemplary embodiment of the present invention, the cooling of the electrical component 15 with coolant is described, but the present invention is not limited thereto. In the case of cooling the electrical component 15 together with the battery module 24, the second water pump 22 may be operated such that the coolant stored in the second storage unit 16c of the reservoir tank 16 is supplied to the battery module 24.

An operation of the case of cooling the battery module 24 in the cooling mode of the vehicle will be described with respect to FIG. 3.

Figure 3:
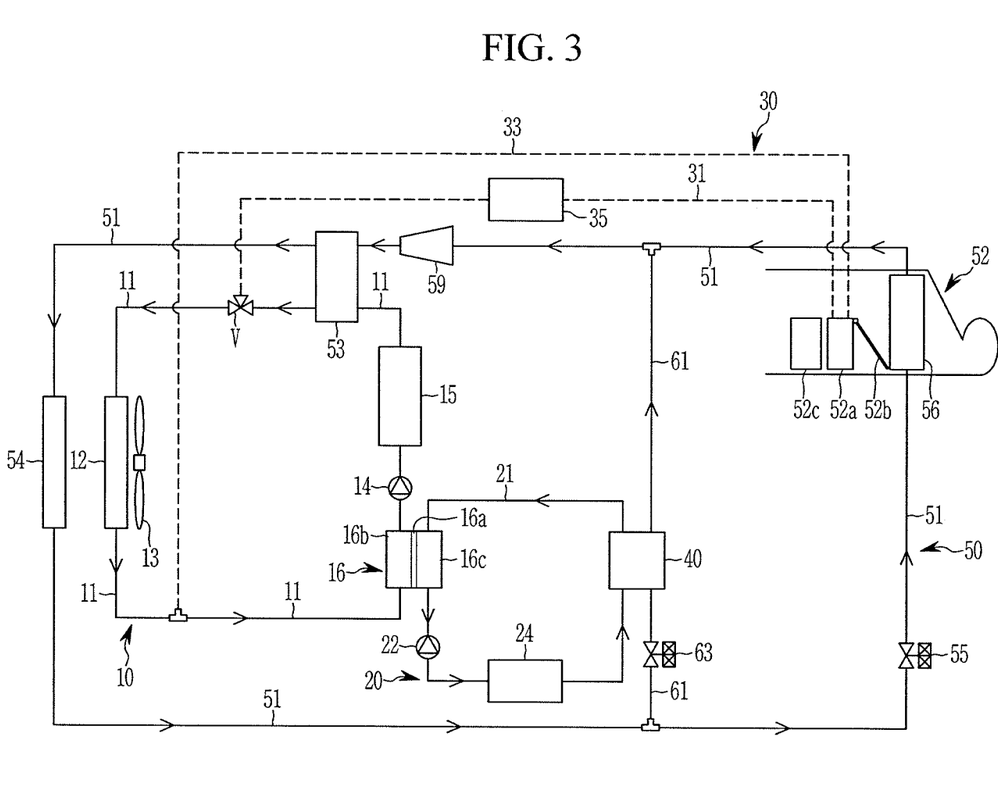
FIG. 3 illustrates an operational state diagram for cooling a battery module by use of a refrigerant in a cooling mode of a vehicle in a vehicle thermal management system according to an exemplary embodiment of the present invention.

FIG. 3 illustrates an operational state diagram for cooling a battery module by use of a refrigerant in a cooling mode of a vehicle in a vehicle thermal management system according to an exemplary embodiment of the present invention.

Referring to FIG. 3, in the cooling apparatus 10, the coolant is circulated in the coolant line 11 through operation of the first water pump 14.

Herein, the first connection line 31 is closed through operation of the valve V to close the second connection line 33.

Accordingly, the coolant cooled in the radiator 12 may be supplied to the condenser 53 through operation of the first water pump 14.

In the battery cooling apparatus 20, the coolant stored in the second storage unit 16c is circulated along the battery coolant line 21 through operation of the second water pump 22.

Accordingly, the coolant having passed through the chiller 40 may be supplied to the battery module 24 while it circulates along the battery coolant line 21 after passing through the second storage unit 16c of the reservoir tank 16 through operation of the second water pump 22.

That is, the battery cooling apparatus 20 may form a closed circuit in which the coolant is independently circulated through the battery coolant line 21 connected to the second storage unit 16c.

In the air conditioner 50, each constituent element operates to cool the interior of the vehicle. Accordingly, the refrigerant is circulated along the refrigerant line 51.

Herein, the refrigerant line 51 connecting the sub-condenser 54 and the evaporator 56 is open through operation of the first expansion valve 55. The refrigerant connection line 61 is open through operation of the second expansion valve 63.

Accordingly, the refrigerant having passed through the sub-condenser 54 may be circulated along the refrigerant line 51 and the refrigerant connection line 61.

Herein, the first and second expansion valves 55 and 63 may expand the refrigerant such that the expanded refrigerant is supplied to the evaporator 56 and the chiller 40, respectively.

The condenser 53 condenses the refrigerant by use of the coolant flowing along the coolant line 11. The sub-condenser 54 may further condense the refrigerant introduced from the condenser 53 through heat exchange with the outside air.

Herein, the coolant passing through the chiller 40 is circulated in the battery coolant line 21 to cool the battery module 24 through operation of the second water pump 22.

That is, the coolant passing through the chiller 40 is cooled through heat exchange with the expanded refrigerant which is supplied to the chiller 40. The coolant cooled in the chiller 40 is supplied to the battery module 24. Accordingly, the battery module 24 is cooled by the cooled coolant.

That is, the second expansion valve 63 expands some of the coolant through the sub-condenser 54 to supply the expanded coolant to the chiller 40, and opens the refrigerant connection line 61.

Accordingly, the refrigerant discharged from the sub-condenser 54 is expanded to enter a low-temperature and low-pressure state through operation of the integrated control valve 63, and flows into the first chiller 40 connected to the first connection line 61.

Thereafter, the refrigerant flowing into the first chiller 40 performs heat exchange with the coolant and flows into the compressor 59 through the first connection line 61.

The coolant having the temperature which is raised while cooling the battery module 24 is cooled through the heat-exchange with the low-temperature and low-pressure refrigerant inside the chiller 40. The cooled coolant is again supplied to the battery module 24 through the battery coolant line 21 and the branch line 31.

As a result, the coolant may efficiently cool the battery module 24 while repeating the above operation.

On the other hand, the remaining refrigerant discharged from the sub-condenser 54 flows through the refrigerant line 51 to cool the interior of the vehicle, and sequentially passes through the first expansion valve 55, the evaporator 56, the compressor 59, and the condenser 53.

Herein, the outside air flowing into the HVAC module 52 is cooled while passing through the evaporator 56 by the low-temperature refrigerant flowing into the evaporator 56.

In the instant case, a portion of the heater 52a through which the cooled outside air passes is closed by the opening and closing door 52b such that the outside air does not pass through the heater 52a. Accordingly, the cooled outside air directly flows into the interior of the vehicle, cooling the vehicle interior.

On the other hand, the coolant having an amount of condensation which is increased while sequentially passing through the condenser 53 and the sub-condenser 54 may be expanded and supplied to the evaporator 56, allowing the refrigerant to be evaporated to a lower temperature.

As a result, in the exemplary embodiment of the present invention, the condenser 53 condenses the refrigerant, and the sub-condenser 54 further condenses the refrigerant, which is advantageous in forming the sub-cooling of the refrigerant.

Furthermore, the sub-cooled refrigerant may be evaporated to a lower temperature in the evaporator 56, improving cooling performance and efficiency.

The refrigerant may cool the interior of the vehicle in the cooling mode of the vehicle while repeating the above-described processes, and at the same time, may cool the coolant through the heat exchange while passing through the chiller 40.

The low-temperature coolant cooled in the chiller 40 is introduced into the battery module 24. Accordingly, the battery module 24 may be efficiently cooled by the low-temperature coolant supplied therefrom.

In the exemplary embodiment of the present invention, an operation of the case of recovering the waste heat of the electrical component 15 in the heating mode of the vehicle will be described with reference to FIG. 4.

Figure 4:
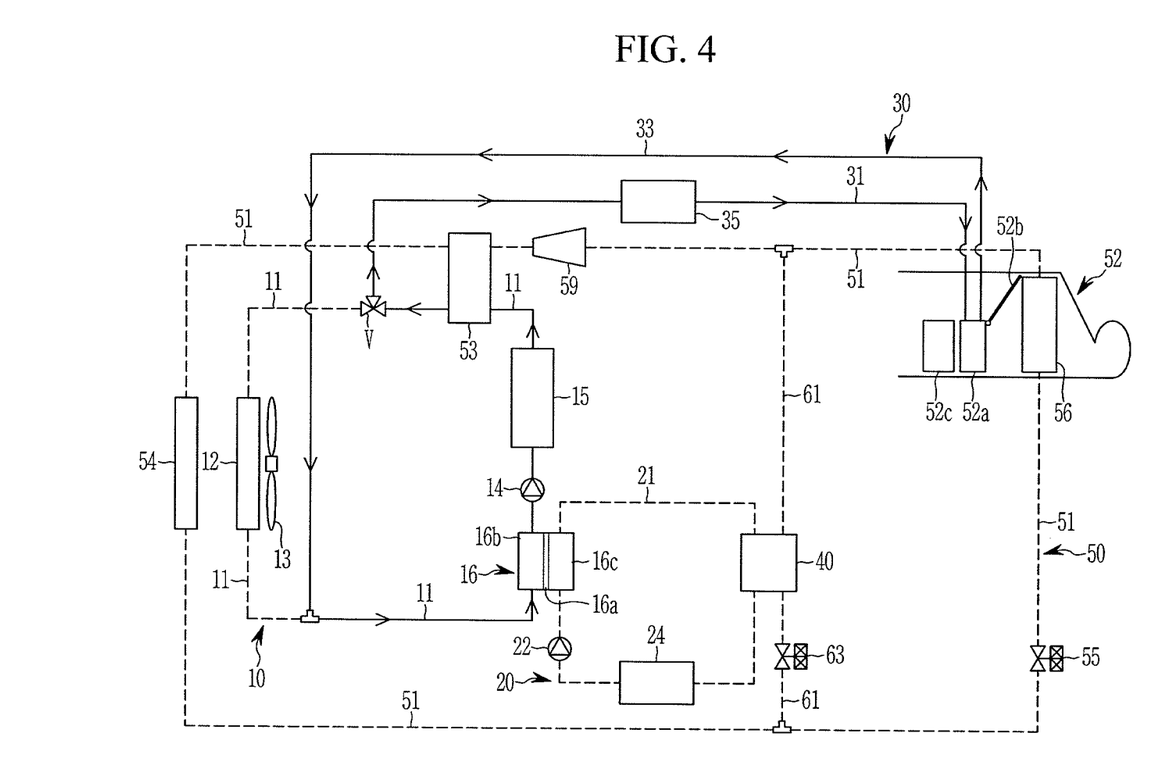
FIG. 4 illustrates an operational state diagram for recovering waste heat of electrical components in a heating mode of a vehicle in a vehicle thermal management system according to an exemplary embodiment of the present invention.

FIG. 4 illustrates an operational state diagram for recovering waste heat of electrical components in a heating mode of a vehicle in a vehicle thermal management system according to an exemplary embodiment of the present invention.

Referring to FIG. 4, the heat management system may recover the waste heat of the electric component 15 and use it for heating the interior of the vehicle.

First, in the cooling apparatus 10, the first water pump 14 is operated for circulation of the coolant. In the instant case, the air conditioner 50 is stopped.

Herein, the first connection line 31 is open through operation of the valve V. At the same time, the second connection line 33 is open.

Furthermore, on the basis of the first and second connection lines 31 and 33, a portion of the coolant line 11 connected to the radiator 12 is closed through operation of the valve V. The battery cooling apparatus 20 is deactivated.

In the present state, the coolant having the temperature that has risen through the electrical component 15 by the operation of the first water pump 14 is supplied to the heater 52a along the first connection line 31 without passing through the radiator 12.

The coolant discharged from the heater 52a is introduced into the first storage unit 16b of the reservoir tank 16 along the coolant line 11 connected to the second connection line 33.

That is, the coolant that has passed through the electrical component 15 continues to circulate along the open coolant line 11 and the first and second connection lines 31 and 33 without passing through the radiator 12, and absorbs the waste heat from the electric component 15, such that the temperature thereof increases.

The coolant having the temperature that has been raised is supplied to the heater 52a through the open first connection line 31 without passing through the radiator 12.

The high-temperature coolant supplied to the heater 52a performs heat exchange with the outside air, and then is introduced into the coolant line 11 through the second connection line 33 without passing through the radiator 12.

Herein, the opening and closing door 52b is open such that the outside air flowing into the HVAC module 52 passes through the heater 52a.

Accordingly, the outside air introduced from the outside flows in a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

Herein, the coolant heater 35 is operated when the temperature of the coolant supplied to the first connection line 31 is lower than a heating temperature inside the vehicle, and may increase a temperature of the coolant.

Meanwhile, when the coolant heater 35 is not provided, and the air heater 52c is provide, the air heater 52c may be selectively operated depending on the temperature of the outside air passing through the heater 52a.

The air heater 52c may be operated when the temperature of the outside air passing through the heater 52a is lower than a target temperature, heating the outside air flowing into the vehicle interior.

The air heater 52c is operated when the temperature of the outside air that has completed heat exchange with the high-temperature coolant while passing through the heater 52a is lower than a predetermined temperature or a target heating temperature.

As a result, when the air heater 52c is operated, outside air may be heated while passing through the air heater 52c, to be introduced into the vehicle interior in a state where the temperature is raised.

In other words, according to an exemplary embodiment of the present invention, it is possible to recover the waste heat generated in the electrical component 15 while repeating the above-described process, and use the waste heat for internal heating, reducing power consumption and improving overall heating efficiency.

In the exemplary embodiment of the present invention, an operation of the case of recovering and cooling the waste heat of the electrical component 15 in the heating mode of the vehicle will be described with reference to FIG. 5.

Figure 5:
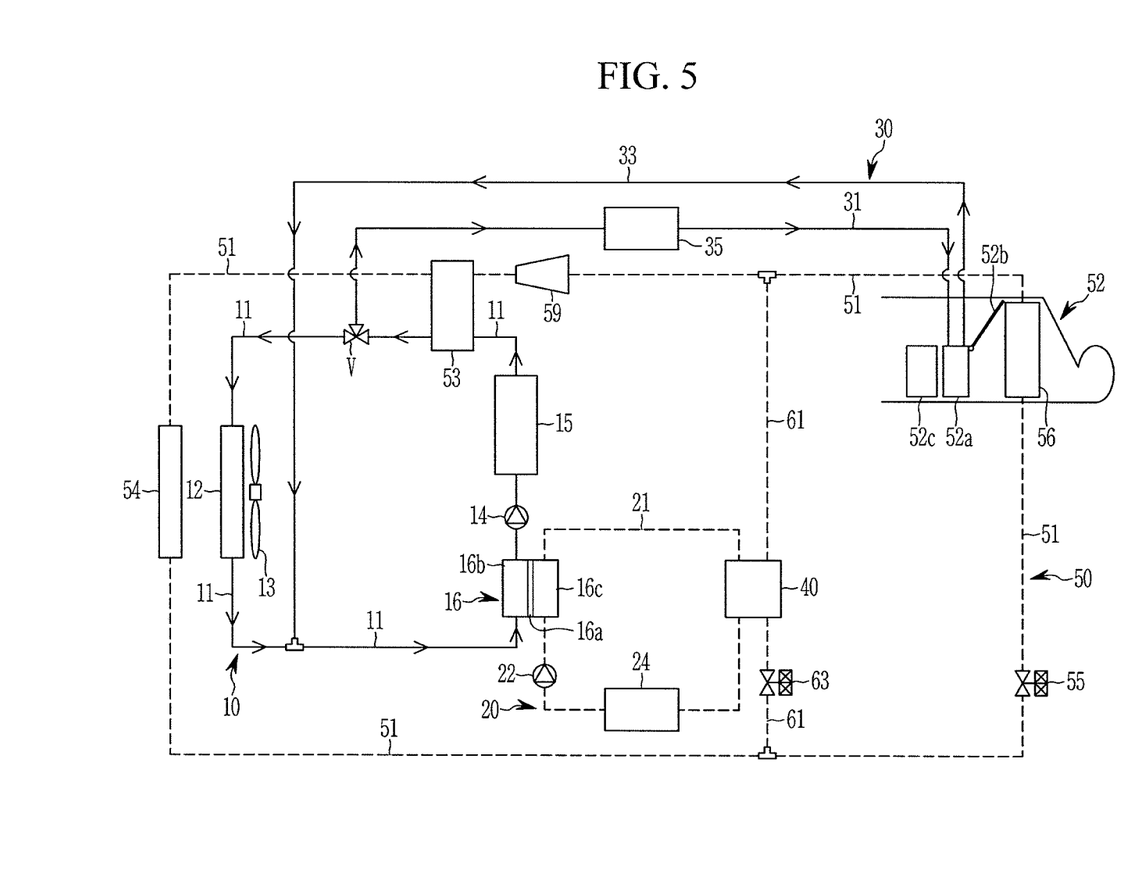
FIG. 5 illustrates an operational state diagram for recovering and cooling waste heat of electrical components in a heating mode of a vehicle in a vehicle thermal management system according to an exemplary embodiment of the present invention.

FIG. 5 illustrates an operational state diagram for recovering and cooling waste heat of electrical components in a heating mode of a vehicle in a vehicle thermal management system according to an exemplary embodiment of the present invention.

Referring to FIG. 5, in the cooling apparatus 10, the first water pump 14 is operated for circulation of the coolant. In the instant case, the air conditioner 50 is deactivated.

Herein, the first connection line 31 is open through operation of the valve V, and the second connection line 33 is open. Simultaneously, the valve V opens a portion of the coolant line 11 connected to the radiator 12.

As a result, on the basis of the first and second connection lines 31 and 33, the portion of the coolant line 11 connected to the radiator 12 is open through operation of the valve V. The battery cooling apparatus 20 is deactivated.

In the present state, some of the coolant having the temperature that has risen through the electrical component 15 by the operation of the first water pump 14 is supplied to the heater 52a along the first connection line 31 without passing through the radiator 12.

The coolant discharged from the heater 52a is introduced into the first storage unit 16b of the reservoir tank 16 along the coolant line 11 connected to the second connection line 33.

That is, some of the coolant that has passed through the electrical component 15 continues to circulate along the open coolant line 11 and the first and second connection lines 31 and 33 without passing through the radiator 12, and absorbs the waste heat from the electric component 15, such that the temperature thereof increases.

Accordingly, some of the coolant having the temperature that has been raised is supplied to the heater 52a through the open first connection line 31 without passing through the radiator 12.

The high-temperature coolant supplied to the heater 52a performs heat exchange with the outside air, and then is introduced into the coolant line 11 through the second connection line 33 without passing through the radiator 12.

Herein, the opening and closing door 52b is open such that the outside air flowing into the HVAC module 52 passes through the heater 52a.

Accordingly, the outside air introduced from the outside flows in a room temperature state in which it is not cooled when passing through the evaporator 56 to which no refrigerant is supplied. The introduced outside air may be converted into a high temperature state while passing through the heater 52a, and flows into the vehicle, heating the interior of the vehicle.

Meanwhile, the remaining coolant, which is not supplied to the heater 52a, is cooled through the radiator 12.

The coolant that has been completely cooled is mixed in the first storage unit 16b of the reservoir tank 16 with the coolant introduced into the coolant line 11 through the second connection line 33, preventing the temperature of the coolant from rising above a predetermined temperature.

Accordingly, the coolant stored in the first storage unit 16b recovers waste heat while passing through the electrical component 15, and at the same time, may efficiently cool the electrical component 15.

When the electrical component 15 is overheated, the valve V may open the coolant line 11 connected to the radiator 12 to allow some of the coolant passing through the electrical component 15 to flow into the first connection line 31 and the remaining coolant to flow into the radiator 12.

As a result, some coolant cooled in the radiator 12 may be supplied to the electrical component 15, preventing the electrical component 15 from overheating.

Therefore, according to an exemplary embodiment of the present invention, it is possible to recover the waste heat generated in the electrical component 15, and use the waste heat for internal heating, reducing power consumption and improving overall heating efficiency.

At the same time, according to an exemplary embodiment of the present invention, some coolant may be introduced into the radiator 12 through operation control of the valve V configured for distributing the flow, to be cooled, and then be supplied to the electrical component 15, efficiently cooling the electrical component 15 and ensuring the cooling performance of the electrical component 15.

In the exemplary embodiment of the present invention, an operation of the case of recovering the waste heat of the electrical component 15 in the heating/dehumidification modes of the vehicle will be described with reference to FIG. 6.

Figure 6:
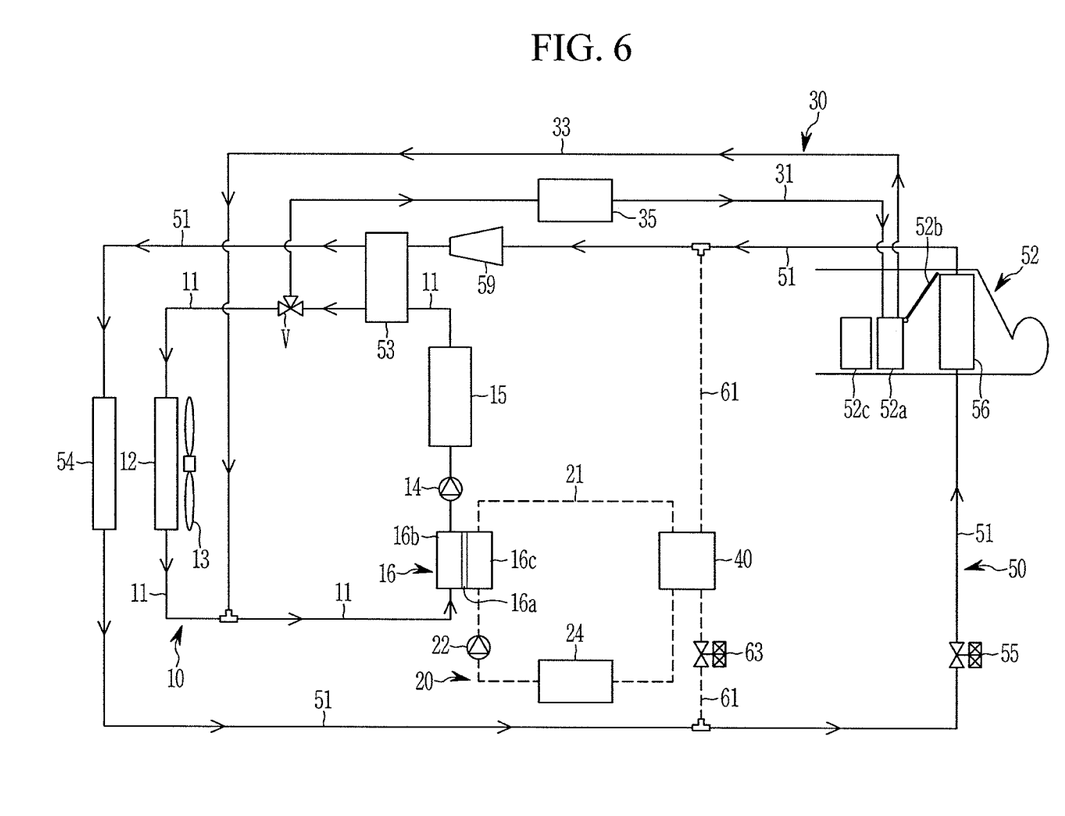
FIG. 6 illustrates an operational state diagram for a heating/dehumidification mode of a vehicle in a vehicle thermal management system according to an exemplary embodiment of the present invention.

FIG. 6 illustrates an operational state diagram for a heating/dehumidification mode of a vehicle in a vehicle thermal management system according to an exemplary embodiment of the present invention.

Referring to FIG. 6, in the cooling apparatus 10, the first water pump 14 is operated for circulation of the coolant.

Herein, the first connection line 31 is open through operation of the valve V, and the second connection line 33 is open. Simultaneously, the valve V opens a portion of the coolant line 11 connected to the radiator 12.

As a result, on the basis of the first and second connection lines 31 and 33, the portion of the coolant line 11 connected to the radiator 12 is open through operation of the valve V. The battery cooling apparatus 20 is deactivated.

In the present state, some of the coolant having the temperature that has risen through the electrical component 15 by the operation of the first water pump 14 is supplied to the heater 52a along the first connection line 31 without passing through the radiator 12.

The coolant discharged from the heater 52a is introduced into the first storage unit 16b of the reservoir tank 16 along the coolant line 11 connected to the second connection line 33.

That is, some of the coolant that has passed through the electrical component 15 continues to circulate along the open coolant line 11 and the first and second connection lines 31 and 33 without passing through the radiator 12, and absorbs the waste heat from the electric component 15, such that the temperature thereof increases.

Accordingly, some of the coolant having the temperature that has been raised is supplied to the heater 52a through the open first connection line 31 without passing through the radiator 12.

The high-temperature coolant supplied to the heater 52a performs heat exchange with the outside air, and then is introduced into the coolant line 11 through the second connection line 33 without passing through the radiator 12.

Meanwhile, the remaining coolant, which is not supplied to the heater 52a, is cooled through the radiator 12.

The coolant that has been completely cooled is mixed in the first storage unit 16b of the reservoir tank 16 with the coolant introduced into the coolant line 11 through the second connection line 33, preventing the temperature of the coolant from rising above a predetermined temperature.

Accordingly, the coolant stored in the first storage unit 16b recovers waste heat while passing through the electrical component 15, and at the same time, may efficiently cool the electrical component 15.

When the electrical component 15 is overheated, the valve V may open the coolant line 11 connected to the radiator 12 to allow some of the coolant passing through the electrical component 15 to flow into the first connection line 31 and the remaining coolant to flow into the radiator 12.

As a result, some coolant cooled in the radiator 12 may be supplied to the electrical component 15, preventing the electrical component 15 from overheating.

Meanwhile, in the air conditioner 50, each component is operated to circulate the refrigerant along the refrigerant line 51.

The condenser 53 condenses the refrigerant by use of the coolant flowing along the coolant line 11. The sub-condenser 54 may further condense the refrigerant introduced from the condenser 53 through heat exchange with the outside air.

Herein, the refrigerant line 51 connecting the sub-condenser 54 and the evaporator 56 is open through operation of the first expansion valve 55. The refrigerant connection line 61 is closed through operation of the second expansion valve 63.

Accordingly, the refrigerant having passed through the sub-condenser 54 may be circulated along the refrigerant line 51.

The first expansion valve 57 may expand supply the refrigerant supplied from the sub-condenser 54 to the evaporator 56. The refrigerant passed through the evaporator 56 is supplied to the compressor 59.

Accordingly, the refrigerant discharged from the compressor 59 may be supplied to the condenser 53.

Herein, the door 52b is open so that the outside air flowed into the HVAC module 52 and passing through the evaporator 56 passes through the heater 52a.

That is, the outside air flowed into the HVAC module 52 is dehumidified while passing through the evaporator 56 by the refrigerant of the low temperature state flowed into the evaporator 56. Next, the outside air is converted into a high temperature state while passing through the heater 52a and inflowing to the vehicle interior, heating and dehumidifying the interior of the vehicle.

Therefore, a described above, according to the vehicle thermal management system according to the exemplary embodiment of the present invention, the temperature of the battery module 24 may be adjusted depending on the mode of the vehicle by use of one chiller 40 for performing heat exchange between the coolant and the refrigerant, and the interior of the vehicle may be heated by use of the coolant, simplifying the entire system.

According to an exemplary embodiment of the present invention, it is also possible to improve the heating efficiency by recovering waste heat from the electrical component 15 and using it for internal heating.

Furthermore, according to an exemplary embodiment of the present invention, it is possible to optimize the performance of the battery module 24 by efficiently controlling the temperature of the battery module 24, and increase an overall travel distance of the vehicle through efficient management of the battery module 24.

Furthermore, the entire system may be simplified to reduce manufacturing cost and weight, and to improve space utilization.

On the other hand, the thermal management system for the vehicle according to various exemplary embodiments of the present invention will be described in detail with reference to FIG. 7.

Figure 7:
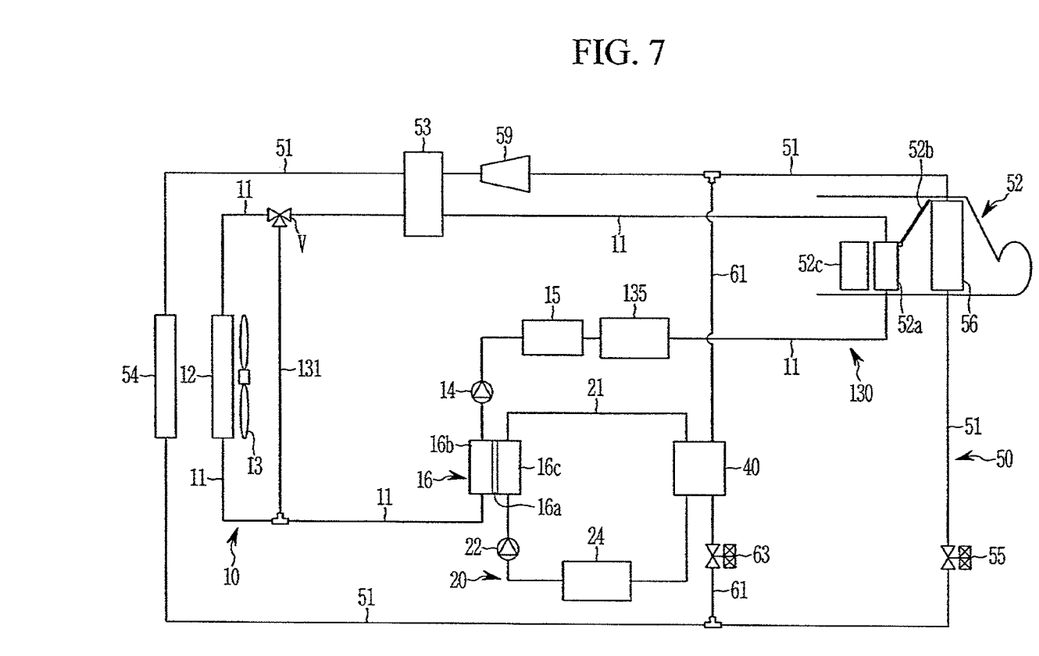
FIG. 7 illustrates a block diagram of a vehicle thermal management system according to various exemplary embodiments of the present invention.

FIG. 7 illustrates a block diagram of a vehicle thermal management system according to various exemplary embodiments of the present invention.

Referring to FIG. 7, the thermal management system for the vehicle according to various exemplary embodiments of the present invention differs only in the configuration of a heating circuit 130 from the above-described embodiment. That is, since the configuration of the cooling apparatus 10, the battery cooling apparatus 20, the chiller 40, and the air conditioner 50, which is the above-described embodiment, is the same, and description of other components except for the heating circuit 130 will be omitted.

Accordingly, in the thermal management system for the vehicle according to various exemplary embodiments of the present invention, the heating circuit 130 includes a branch line 131 and the heater 52a, as shown in FIG. 7.

First, a first end portion of the branch line 131 is connected to the coolant line 11 through the valve V. A second end portion of the branch line 131 is connected to the coolant line 11 between the radiator 12 and the electrical component 15.

The heater 52a may be connected to the coolant line 11 that connects the electrical component 15 and the valve V.

The heater 52a may be provided inside the HVAC module 52 included in the air conditioner 50 as in the above-described embodiment.

Here, a coolant heater 135 may be provided in the coolant line 11 between the electrical component 15 and the heater 52a.

The coolant heater 135 may selectively heat the coolant supplied to the heater 52a.

That is, the coolant heater 135 is ON-operated when the temperature of the coolant supplied to the heater 52a in the heating mode of the vehicle is lower than a target temperature by heating the coolant circulated in the coolant line 11 after passed through the electrical component 15, inflowing the coolant of which the temperature is increased to the heater 52a.

On the other hand, in the exemplary embodiment of the present invention, it is described that the coolant heater 135 is provided in the coolant line 11 between the electrical component 15 and the heater 52a, however it is not limited thereto, and an air heater 52c to increase the temperature of the outside air inflowing to the interior of the vehicle may be applied instead of the coolant heater 135.

The air heater 52c may be operated to raise the temperature of the outside air passing through the heater 52a when the temperature of the coolant supplied to the heater 52a is lower than a target temperature for internal heating.

The air heater 52c may be mounted on the rear of the heater 52a toward the interior of the vehicle inside the HVAC module 52 to selectively heat the outside air passing through the heater 52a.

That is, the heating apparatus 30 may be applied to one of the coolant heater 35 and the air heater 52c.

The operation of the heating circuit 130 configured as described above will be described in more detail below.

In a heating mode of the vehicle, the branch line 131 is open through an operation of the valve V. At the same time, simultaneously, the coolant line connected to the radiator 12 is closed.

In the present state, when the first water pump 14 is operated, the coolant having an increased temperature while passing through the electrical component 15 may be supplied to the heater 52a along the coolant line 11.

The coolant discharged from the heater 52a is supplied to the electrical component 15 through the coolant line 11 and the branch line 131 without passing through the radiator 12.

That is, the coolant that has passed through the electrical component 15 continues to circulate along the coolant line 11 and the branch line 131 without passing through the radiator 12, and absorbs the waste heat from the electric component 15, such that the temperature thereof increases. The coolant having the temperature that has been raised is supplied to the heater 52a connected to the coolant line 11, heating the interior of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A thermal management system for a vehicle, the system comprising:
   a cooling apparatus including a radiator, a first water pump, and a valve connected through a coolant line, and configured to circulate a coolant in the coolant line to cool at least one electrical component mounted in the coolant line;
   a battery cooling apparatus including a second water pump and a battery module connected by a battery coolant line, and configured to circulate the coolant in the battery module;
   a chiller connected to the battery coolant line and connected to an air conditioner through a refrigerant connection line connected to the battery coolant line and connected to a refrigerant line of the air conditioner, and is configured to adjust a temperature of the coolant by performing heat exchange between the coolant supplied to the battery coolant line and a refrigerant selectively supplied from the air conditioner; and
   a heating circuit for warming an interior of the vehicle by use of the coolant having a temperature increased while the coolant passes through the at least one electrical component,
   wherein a reservoir tank having a diaphragm formed in the reservoir tank is mounted in the coolant line between the radiator and the first water pump, and
   wherein the reservoir tank includes a first storage unit partitioned by the diaphragm and a second storage unit, wherein the coolant line is connected to the diaphragm and the battery coolant line is connected to the second storage unit.

2. The thermal management system of claim 1, wherein the valve is a three-way valve configured for distributing a flow.

3. The thermal management system of claim 1, wherein the at least one electrical component includes at least one selected from the group of an electric power control unit, a motor, an inverter, and an on board charger.

4. The thermal management system of claim 1, wherein the heating circuit includes:
   a branch line having a first end portion connected to the coolant line through the valve, and a second end portion connected to the coolant line between the radiator and the at least one electrical component to bypass the radiator; and
   a heater connected to the coolant line connecting the at least one electrical component and the valve,
   wherein the heater is mounted inside a heating, ventilation, and air conditioning module disposed in the air conditioner.

5. The thermal management system of claim 4,
   wherein a coolant heater is mounted in the coolant line between the at least one electrical component and the heater, and
   wherein the coolant heater selectively heats the coolant supplied to the heater.

6. A thermal management system for a vehicle, the system comprising:
   a cooling apparatus including a radiator, a first water pump, and a valve connected through a coolant line, and configured to circulate a coolant in the coolant line to cool at least one electrical component mounted in the coolant line;
   a battery cooling apparatus including a second water pump and a battery module by a battery coolant line, and configured to circulate the coolant in the battery module;
   a chiller connected to the battery coolant line and connected to an air conditioner through a refrigerant connection line connected to the battery coolant line and connected to a refrigerant line of the air conditioner, and is configured to adjust a temperature of the coolant by performing heat exchange between the coolant supplied to the battery coolant line and a refrigerant selectively supplied from the air conditioner; and
   a heating circuit for warming an interior of the vehicle by use of the coolant having a temperature increased while the coolant passes through the at least one electrical component,
   wherein the heating circuit includes:
      a first connection line having a first end portion connected to the coolant line through the valve, and a second end portion connected to a heater; and
      a second connection line having a first end portion connected to the coolant line between the radiator and a reservoir tank, and a second end portion connected to the heater, and
   wherein the heater is mounted inside a heating, ventilation, and air conditioning module disposed in the air conditioner.

7. The thermal management system of claim 6,
wherein the heating circuit further includes a coolant heater mounted in the first connection line, and
wherein the coolant heater is selectively operated to heat the coolant supplied to the heater through the first connection line.

8. The thermal management system of claim 6, wherein the air conditioner includes:
the HVAC module including:
an evaporator connected thereto through the refrigerant line; and
a door configured to control outside air passing through the evaporator to be selectively introduced into the heater in accordance with a cooling mode, a heating mode, and a heating/dehumidifying mode of the vehicle;
a condenser connected to the coolant line and the refrigerant line, to circulate the coolant in the condenser to perform heat exchange between the coolant and the refrigerant supplied in the condenser through the refrigerant line;
a compressor connected between the evaporator and the condenser through the refrigerant line;
a sub-condenser mounted in the refrigerant line between the condenser and the evaporator;
a first expansion valve mounted in the refrigerant line between the sub-condenser and the evaporator; and
a second expansion valve mounted in the refrigerant connection line.

9. The thermal management system of claim 8,
wherein a first end portion of the refrigerant connection line is connected to the refrigerant line between the sub-condenser and the first expansion valve, and
wherein a second end portion of the refrigerant connection line is connected to the refrigerant line between the evaporator and the compressor.

10. The thermal management system of claim 8,
wherein each of the chiller and the condenser is a water-cooled heat exchanger, and the sub-condenser is an air-cooled heat exchanger.

11. The thermal management system of claim 8,
wherein the HVAC module further includes an air heater mounted at an opposite side of the evaporator, with the heater disposed between the air heater and the evaporator to selectively heat outside air passing through the heater.

12. The thermal management system of claim 11,
wherein the air heater is operated to raise a temperature of the outside air passing through the heater when a temperature of the coolant supplied to the heater is lower than a target temperature for internal heating.

13. The thermal management system of claim 8, wherein when the battery module is cooled in the cooling mode of the vehicle,
the coolant is configured to circulate through the coolant line by an operation of the first water pump in the cooling apparatus;
the first connection line is closed through operation of the valve, and the second connection line is closed;
in the battery cooling apparatus, the coolant is configured to be circulated along the battery coolant line through operation of the second water pump;
the refrigerant line connecting the sub-condenser and the evaporator is open through operation of the first expansion valve in the air conditioner;
the refrigerant connection line is open through operation of the second expansion valve; and the first and second expansion valves are configured to expand the refrigerant supplied to the refrigerant line and the refrigerant connection line, respectively, and to supply the expanded refrigerant to the evaporator and the chiller.

14. The thermal management system of claim 8, wherein in the heating/dehumidification mode of the vehicle,
the first connection line is open through operation of the valve, and the second connection line is open;
in the cooling apparatus, a portion of the coolant having a temperature that has risen through the at least one electrical component by operation of the first water pump is configured to be supplied to the heater along the first connection line, and a portion of the coolant is configured to be flowed into the radiator;
the coolant passing through the radiator and the coolant discharged from the heater and introduced into the second connection line flow together into the reservoir tank along the coolant line;
in the air conditioner, the refrigerant line connecting the sub-condenser and the evaporator is open through operation of the first expansion valve;
the refrigerant connection line is closed through operation of the second expansion valve; and
the first expansion valve expands the refrigerant and supplies the refrigerant to the evaporator.

15. The thermal management system of claim 6, wherein in cooling the at least one electrical component using the coolant,
the first connection line is closed through operation of the valve, and the second connection line is closed; and
the coolant cooled in the radiator and stored in the first storage unit of the reservoir tank is configured to be circulated along the coolant line through operation of the first water pump, and is configured to be supplied to the at least one electrical component.

16. The thermal management system of claim 6, wherein when waste heat of the at least one electrical component is recovered in a heating mode of the vehicle,
the first connection line is open through operation of the valve, and the second connection line is open;
in the cooling apparatus, a portion of the coolant line connected to the radiator is closed based on the first and second connection lines;
a portion of the coolant having a temperature that has risen through the at least one electrical component by an operation of the first water pump is configured to be supplied to the heater along the first connection line without passing through the radiator; and
the coolant discharged from the heater is configured to be introduced into the reservoir tank along the coolant line connected to the second connection line.

17. The thermal management system of claim 16,
wherein the valve opens the coolant line connected to the radiator to allow a portion of the coolant passing through the at least one electrical component to flow into the first connection line and a portion of the coolant to flow into the radiator when at least one electrical component is overheated, and
wherein the coolant passing through the radiator is configured to be introduced into the reservoir tank along the coolant line along with the coolant flowing through the second connection line.

18. The thermal management system of claim 6,
wherein the reservoir tank having a diaphragm formed in the reservoir tank is mounted in the coolant line between the radiator and the first water pump, and wherein the reservoir tank includes a first storage unit partitioned by the diaphragm and a second storage unit, wherein the coolant line is connected to the diaphragm and the battery coolant line is connected to the second storage unit.

\* \* \* \* \*